United States Patent
Nicolai et al.

[11] Patent Number: 6,123,400
[45] Date of Patent: Sep. 26, 2000

[54] SWITCHING CABINET

[75] Inventors: Walter Nicolai, Buseck; Udo Münch, Sinn; Heinrich Strackbein, Biebertal, all of Germany

[73] Assignee: Rittal-Werk Rudolf Loh GmbH & Co. KG, Herborn, Germany

[21] Appl. No.: 09/308,444

[22] PCT Filed: Nov. 6, 1997

[86] PCT No.: PCT/EP97/06144

§ 371 Date: May 19, 1999

§ 102(e) Date: May 19, 1999

[87] PCT Pub. No.: WO98/23005

PCT Pub. Date: May 28, 1998

[30] Foreign Application Priority Data

Nov. 19, 1996 [DE] Germany .......................... 196 47 814

[51] Int. Cl.[7] ................................................. A47G 29/00
[52] U.S. Cl. .................... 312/265.1; 211/26; 211/189
[58] Field of Search .................... 312/265.1, 265.2, 312/265.3, 265.4, 223.1; 211/182, 189, 190, 191, 26

[56] References Cited

U.S. PATENT DOCUMENTS 5,749,476   5/1998   Besserer et al. ............... 312/265.1

FOREIGN PATENT DOCUMENTS 43 36 204   4/1995   Germany.
43 36 285   4/1995   Germany.
2 231 117   11/1990   United Kingdom.

Primary Examiner—Peter M. Cuomo
Assistant Examiner—Gerald A. Anderson
Attorney, Agent, or Firm—Pauley Petersen Kinne & Fejer

[57] ABSTRACT

A switching cabinet having a rack with horizontal and vertical frame profiles. The horizontal frame profiles form a lower and upper frame and the vertical frame profiles are secured in the corner areas of the upper and lower frames. The vertical frame profiles are symmetrical to cross-sectional diagonals running across virtual, vertical outer edges of the rack. Greater flexibility in installing built-in fixtures inside the switch cabinet is achieved by providing the vertical frame profiles which are turned towards the inside of the switching cabinet with an open inner cavity having two inner walls extending in the longitudinal direction of the profiles so that vertical assembly rails can be mounted in the inner cavity, one profiled side standing perpendicular to the outside of the rack is joined to the inner walls. The inner walls, the assembly racks and the profiled sides can have rows of fastening cavities inserted according to a division grid.

18 Claims, 8 Drawing Sheets

SWITCHING CABINET

BACKGROUND OF THE INVENTION

1. Field of the Invention

This invention relates to a switching cabinet with a rack having horizontal and vertical frame profiles, where the horizontal frame profiles form a lower and an upper frame and the vertical frame profiles are attached in corner regions of the lower and the upper frame, where the vertical frame profiles are symmetrical to cross-sectional diagonals running across the virtual vertical outer edges of the rack, where the vertical frame profiles which are turned toward an inside of the switching cabinet have an open inner cavity, where vertical assembly rails can be mounted in the inner cavity, where one profiled side standing perpendicular to the outside of the rack is joined to the inner walls, and where the inner walls, the assembly rails and the profiled sides can be fitted with rows of fastening cavities inserted according to a division grid.

2. Description of Prior Art

In one known switching cabinet, the rack has twelve of the same frame profiles which meet each other orthogonally in the frame corner regions. The frame profiles have two inner walls which are aligned parallel to the associated sides of the rack. Profiled sides protrude from the inner walls and are positioned at a right angle to the side of the rack. Thus the inner walls and the profiled sides form a vertical, inner edge facing the interior of the switching cabinet. Assembly rails can be attached to the frame profiles for mounting fixtures in the interior of the switching cabinet. The assembly rails are designed as enclosed hollow profiles and feature two contact sides at a right angle. The other two sides are used as assembly sides and each has a row of attachment cavities.

The assembly rails rest on contact sides against the inner walls of the frame profile and are attached here; for example, they are welded or screwed. The two assembly sides face the interior of the switching cabinet.

SUMMARY OF THE INVENTION

It is one object of this invention to provide a switching cabinet of the type mentioned above, which offers great variability for the attachment of fixtures.

The object is achieved with inner walls and profiled sides having rows of attachment cavities incorporated in a division grid.

In its basic version without the mounting rails, this switching cabinet allows the attachment of fixtures to the attachment cavities of the frame profile. The use of four rows of attachment cavities offers great versatility in assembly. One inner wall and the profiled side attached thereto are always allocated to a back side or a front side of the switching cabinet. The other inner wall is allocated to the profiled side of the associated switching cabinet. This configuration makes it possible to allocate fixtures individually to the front, the back or the side. For example, wall elements standing parallel to the back and in addition to one side, can be attached to the inner walls in order thus to form insulating walls or air inlet shafts.

As a result of the use of assembly rails, the versatility of the attachment can be even further increased. In particular, the formation of one or more rows of attachment cavities can be varied with regard to their division grid in comparison to the frame profile. Thus, the points of attachment can be varied at random along the frame profile. The variation of the division grid also provides the potential to form a switching cabinet in a simple manner, with combined metric and inch-based dimensions. For example, the attachment cavities of the frame profile can be spaced metrically, and those of the assembly rails can be spaced in inches.

According to one preferred embodiment of this invention, the vertical frame profiles pass at their profiled sides into sealing surfaces running parallel to the side surfaces of the rack. At these flat profiled sections, side walls, one back wall and/or one cabinet door can be installed to form a seal. Due to the use of these sealing surfaces, good sealing action can be achieved. In particular, the attachment of HF-seals are easily possible.

The lower and the upper frame can have open cavities in corner regions toward the outside of the rack; these cavities are formed by the front sides of the horizontal frame profiles butt-jointed at a right angle. The vertical frame profiles can be inserted into the cavities and thus rest directly against the front sides of the horizontal frame profile. The use of a separate corner connector is not absolutely necessary in order to connect the horizontal and the vertical frame profiles together. Bracing of the vertical frame profiles solely against the front sides of the horizontal frame profile ensure a dependable attachment.

However, it is also possible to provide corner connectors in the cavities of the lower and upper frame, such that the vertical frame profiles can be inserted horizontally into the cavities and can be securely attached to the corner connectors.

In this embodiment of a switching cabinet, in a final assembled rack, a vertical frame profile can be replaced, even subsequently. It need merely be loosened from the connectors and can then be pulled out horizontally from the cavity. In the same manner, the vertical frame profiles can again be inserted horizontally into the cavities. With the vertical frame profile removed, the interior space of the rack is easily accessible. In addition, two vertical frame profiles of one side of the rack can also be removed from the rack. Solely the two remaining vertical frame profiles and the lower or upper frame form a stand-alone, adjustable unit which is easily accessible for assembly purposes.

In another preferred embodiment of this invention, the vertical frame profiles have an outer cavity running in the profile length direction. The outer cavity is formed by a wall which stands perpendicular to the cross-sectional diagonals running through the virtual, outer edges of the rack, and two centering sections of the vertical frame profile are connected to the wall at an angle.

Attachments or fixtures, for example a door hinge, a closing system, a side wall or a back wall reinforcing unit, can be attached to the wall. The centering recesses in this case will ensure that these attachment elements are aligned to their assigned attachment positions.

To form a separate assembly unit, it is possible to design this invention such that at least the vertical frame profiles of one side of the rack are combined by connecting pieces into a separate assembly unit that can be equipped outside the rack with electronic fixtures, and then subsequently installed in the rack.

The connecting pieces can be formed as assembly rails which have an assembly surface facing the interior of the switching cabinet. The assembly surface is then preferably equipped with at least one row of attachment cavities positioned at equal spacing.

To reduce the consumption of components, the lower and upper frames can be preferably of identical design.

It is even possible to equip the upper frame with a rain trough so that the water running off from the upper side of the switching cabinet can be drained off in a controlled manner.

For a simple attachment of an assembly rail to the inner cavity of the vertical frame profile, at least one profiled leg can have at least one insertion cavity, by which it can be inserted onto an attachment element that is mounted to the vertical frame profile. In this case, the attachment element can be attached as a separate element to the vertical frame profile. If the assembly rail is inserted into the attachment element, then it will be adjustable with respect to the vertical frame profile for attachment of the assembly rails.

BRIEF DESCRIPTION OF THE DRAWINGS

This invention will be explained in greater detail below, based on the design embodiments shown in the figures wherein.

DESCRIPTION OF PREFERRED EMBODIMENTS

Figure 1:
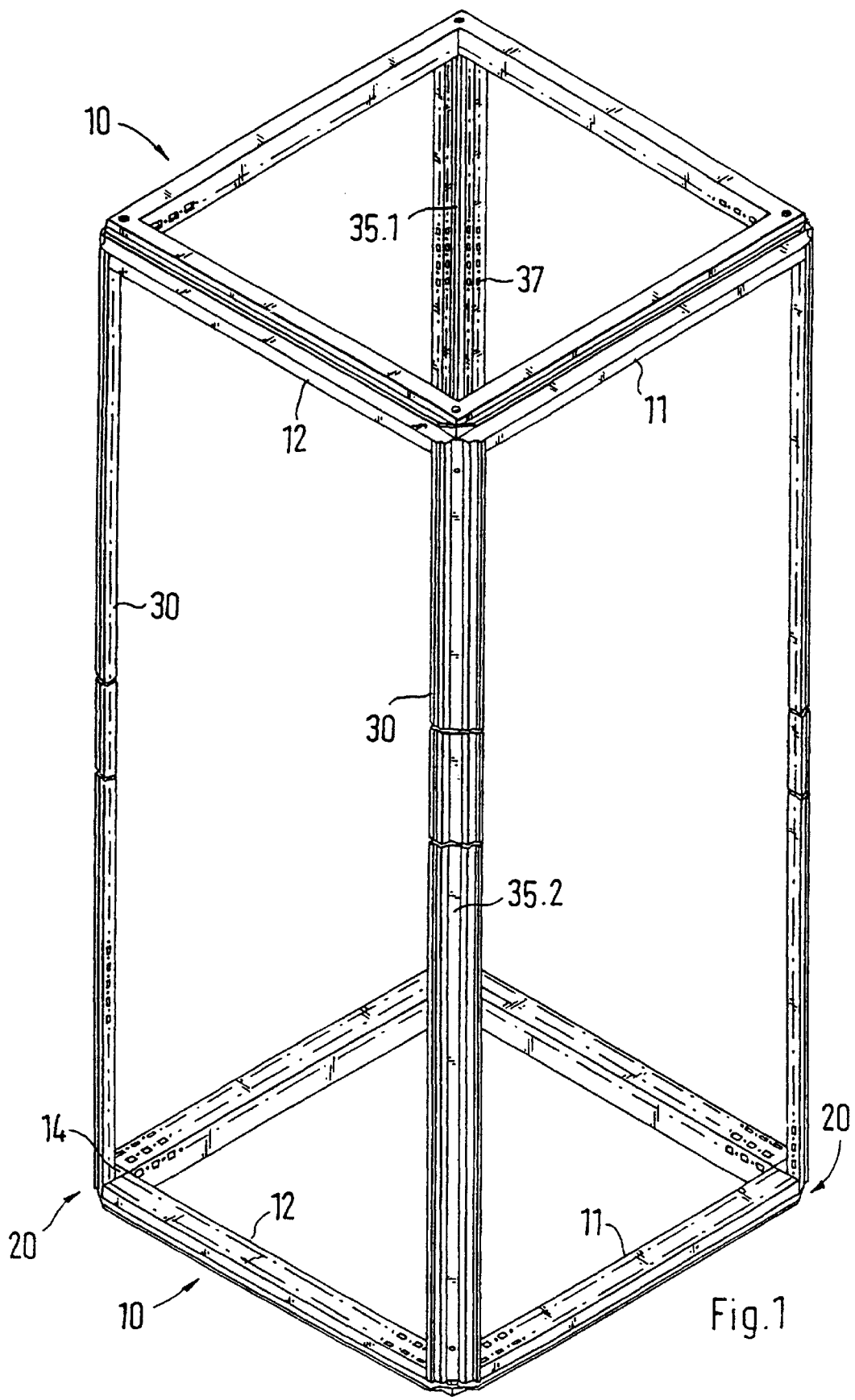
FIG 1 is a perspective side view of a rack having frame profiles for a switching cabinet.

FIG. 1 shows a rack for a switching cabinet. The rack essentially includes lower/upper frames 10 and four vertical frame profiles 30. The vertical frame profiles 30 connect the lower frame 10 with the upper frame 10. The lower frame and the upper frame 10 are of the same design, so that they can be replaced by one another.

The lower frame and the upper frame 10 each has two horizontal frame profiles 11, 12 each running in the direction of the depth and width of the switching cabinet. The horizontal frame profiles 11, 12 have rows of attachment cavities 37 on their profiled sides facing an interior of the rack. Threaded cavities 37.1 are located between the individual attachment cavities 37. Also, the vertical frame profiles 30 have attachment cavities 37 or threaded cavities 37.1 facing the interior of the rack. For example, assembly rails like those shown in detail in FIG. 6 can be attached to the mounting cavities 37. The vertical frame profiles 30 are connected via connectors 14 to the lower frame or upper frame 10. The connectors 14 are located in a region of the corner cavities 20 of the lower frame or upper frame 10. The attachment of the vertical frame profiles 30 to the connectors 14 takes place, for example, by means of a weld.

Figure 2:
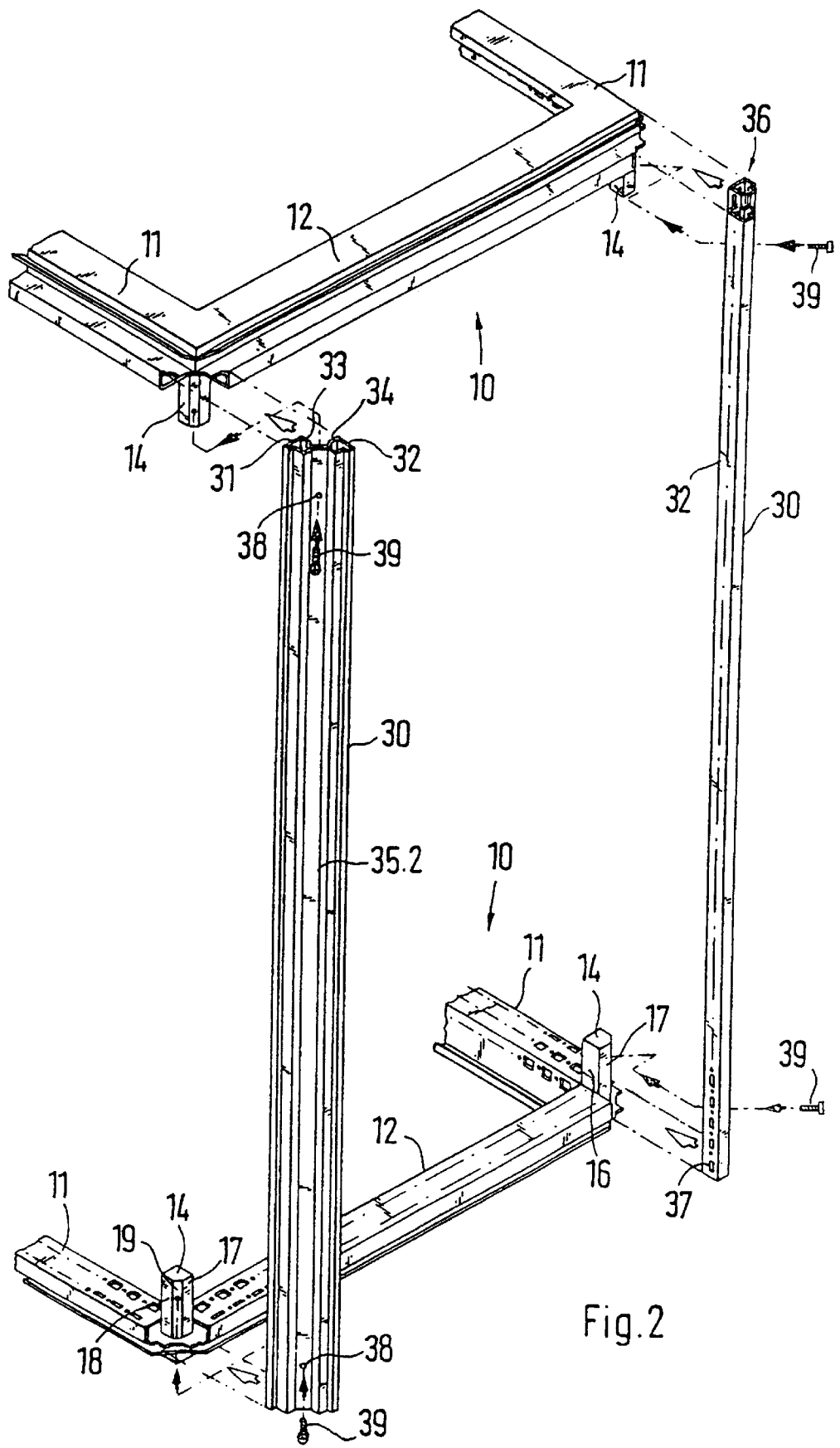
FIG. 2 is an exploded perspective view of a portion of a rack.

FIG. 2 shows one alternative attachment of the vertical frame profile 30 to the horizontal frame profiles 11, 12. The cavities 20 are formed on the butt-jointed ends of the horizontal frame profiles 11, 12. The connectors 14 are installed in the cavities 20. The connector 14 is essentially of a square design. At one of its vertical ends, however, the connector 14 has a slanting surface 19 in which one or more threaded cavities 14.1 are installed. The slanting surface 19 points toward the outer side of the rack. To attach the connector 14, it is set up onto the support surface 20.1 and rests with its contact surface 16 facing the interior of the switching cabinet, against the front-side ends of the horizontal frame profiles 11, 12. In this position the connector 14 can be welded into the cavity 20. Thus, the connector 14 can be positioned precisely at a right angle to the associated horizontal frame profiles 11, 12. The front ends of the horizontal frame profiles 11, 12 and also the support surface 24 form an outward-open cavity for the front side of the vertical frame profile 30. The vertical frame profile 30 has an open inner cavity 35.1 facing the interior of the rack. The inner cavity 35.1 is bounded by two inner walls 33, 34 of the vertical frame profile 30. The inner walls 33, 34 run in the length direction of the frame profile 30 and are positioned at a right angle to one another.

With the mounted vertical frame profile 30, the inner walls 33, 34 rest against the stops 17, 18 of the connector 14. Profiled sides 31, 32 join at a right angle to the inner walls 33, 34 of the vertical frame profile 30. The profiled sides 31, 32 rest against the front ends of the horizontal frame profiles 11, 12. To attach the vertical frame profiles 30 in the region of their front ends there is one or more screw cavities 38. The screw cavities 38 can be positioned to align with the threaded cavities 14.1 of the connector 14. In order to achieve a simplified assembly, the spacing from the front end of the frame profile 30 out to the middle of the drilled hole of the screw cavity 38 corresponds to the spacing of the support surface 24 to the threaded cavity 14.1. An attachment screw 39 can be passed through the screw cavity 38 and then screwed into the threaded cavity 19 of the connector 14. Thus the inner walls 33, 34 are tensioned against the stops 17 and 18 of the connector 14. At the same time, the vertical frame profile 30 is pulled into the cavity 20 at the front ends of the horizontal frame profiles 11, 12. The vertical frame profile 30 is securely attached to the connector 14 in its final assembly position and is aligned precisely vertically. The drawing shows that the vertical frame profile 30 can be installed from outside the rack into the cavity 20. The vertical frame profiles 30 can thus also be subsequently installed in or removed from the final assembled rack. The interior space of the rack can advantageously be easily accessible. For example, a stand-alone, adjustable unit can be constructed from the lower frame and upper frame 10 and the two rear, vertical frame profiles 30. The stand-alone, adjustable, partial rack can have electronic fixtures or the like. Next, the two front vertical frame profiles 30 can be attached, so that the rack is complete.

Figure 3:
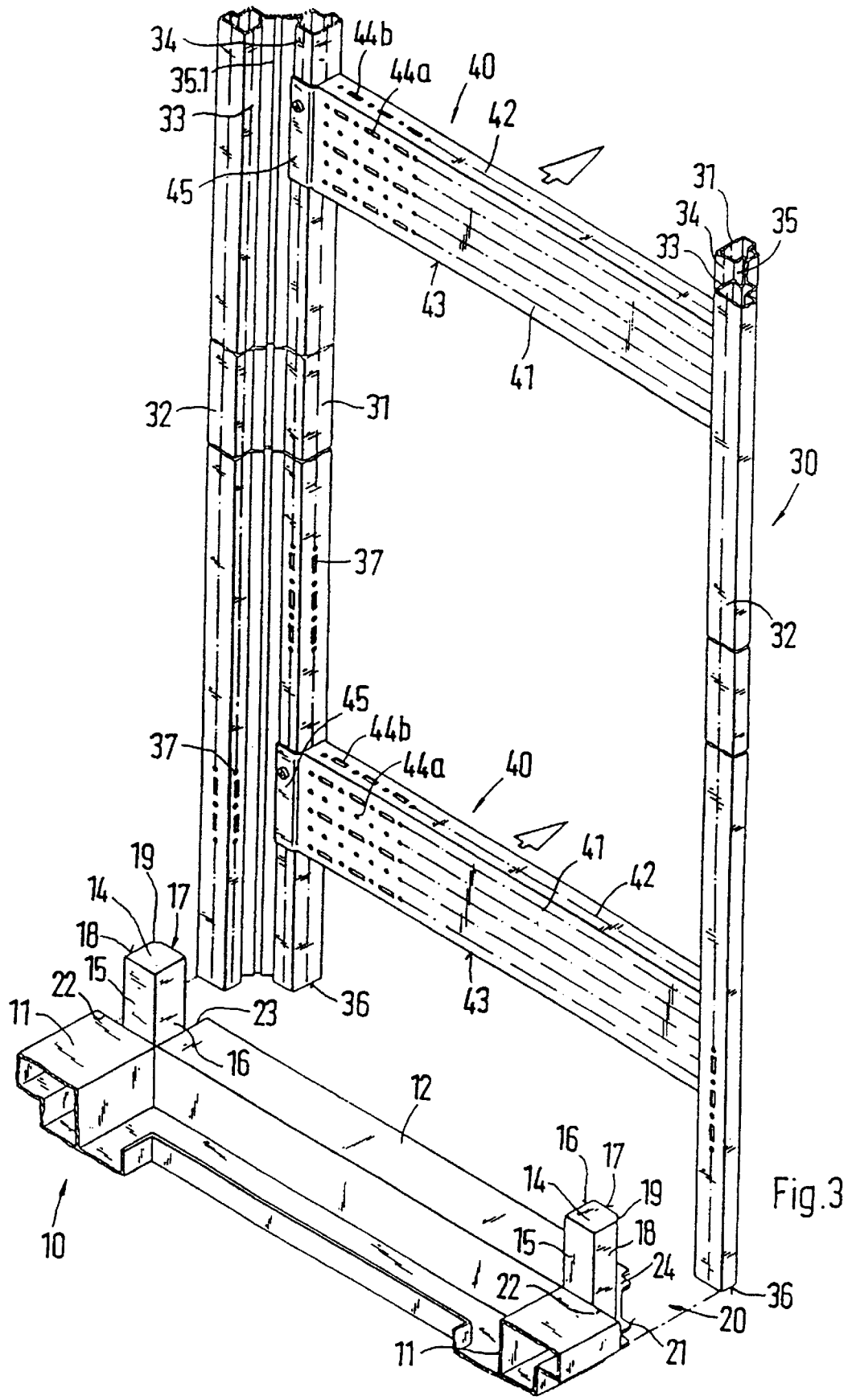
FIG. 3 is a portion of a rack with a separate assembly unit.

FIG. 3 shows a portion of a rack. In this case, the two vertical frame profiles 30 of one side of the rack are combined by means of connecting pieces 40 into one assembly unit. The two connecting pieces 40 are designed in this case as assembly rails. These assembly rails have a U-shaped cross section formed from an assembly surface 41 and two adjoining side parts 42, 43. The side parts 42, 43 are parallel. The assembly surface 41 is facing the interior space of the rack. On the side there is a front attachment section 45 connected to the assembly surface 41. The attachment section 45 is designed as a gluing edge which partly covers the associated, inner wall 34 of the vertical frame profile.

As shown, the connecting piece 40 can be screwed via the attachment section 45 to the vertical frame profiles 30. Electronic fixtures can be attached to the connecting pieces 40 by installing attachment cavities 44a, 44b in the assembly surface 41 and the side parts 42, 43. The attachment cavities 44a, 44b are positioned in lines and have the same spacing or division grid. The division grid corresponds to the division grid of the attachment cavities 37 of the vertical frame leg.

In the assembly unit illustrated in the figure the connecting pieces 40 are located in the upper and in the lower region of the vertical frame profiles 30. However, more than two connecting pieces 40 can be used to form the assembly unit. In particular, cross struts can also be used, which are placed at a slant between the two vertical frame legs 30. For attachment of the assembly unit to the base unit 10, the base unit 10 is inserted into the cavities 20 in the vertical position. First, the vertical frame profile 30 with its front sides 36 is set onto the support surface 24 of the base frame 10. Next, the complete assembly unit is pushed into the cavity 20 opposite the arrows shown in the figure. The inner walls 33, 34 of the vertical frame profiles 30 will thus slide along the allocated stops 18 of the comer connector 14. The stops 18 operate as guides. The insertion motion is limited by the profiled sides 32 of the vertical frame profiles 30 which come to rest against the front sides of the horizontal frame profiles 11. At the same time, the inner wall 34 comes up against the stop 17 of the connector 14. A beveled flank 19 is provided between the two stops 17 and 18 of the corner connector 14. The beveled flank 19 protrudes into the inner cavity 35.1 of the vertical frame profile 30. A free space is formed between the beveled flank 19 and the base surface of the inner cavity 35.1. The free space will ensure that the vertical frame profiles 30 rest against the stops 17, 18 only with their inner walls 33, 34. Thus, the assembly unit can be aligned exactly to the base unit 10. For attachment, the assembly unit is screwed to the base frame 10. The type of screw connection for the vertical frame profile 30 with the comer connectors 14 can be seen in FIG. 2. However, it is also possible to weld the vertical frame profiles 30 directly to the base frame 10 and the comer connector 14. In addition to the base frame 10, the upper frame 10, preferably with the same design, is used. The upper frame 10 is tied in the upper region to the vertical frame profile 30. The rack can then be completed with additional vertical frame profiles 30.

The assembly unit is located preferably on a back side of the switching cabinet. However, it is also possible to provide the assembly unit on one side of the rack. There are several possibilities for reinforcing the assembly unit. In particular, the inner walls 33, 34 can be used in pairs, or the profiled sides 31, 32 of the vertical frame profiles 30 can be used to form two mutually parallel, offset assembly planes. In the figure, the first assembly plane is partly formed by the assembly surface 41 of the connecting pieces 40. These offset assembly planes can also be created perpendicular to the assembly unit in the rack. In this case, the reinforcing cavities 37, 37.1 of the inner walls 33 or of the profiled sides 31 are used.

In order to avoid the danger of injury, the support surfaces 24 of the cavities 20 have a profiled shape 21. The profiled shape 21 is adapted to the outer geometry of the vertical frame profiles 30. Thus, no edges of the base unit will protrude beyond the vertical frame profile.

Figure 4:
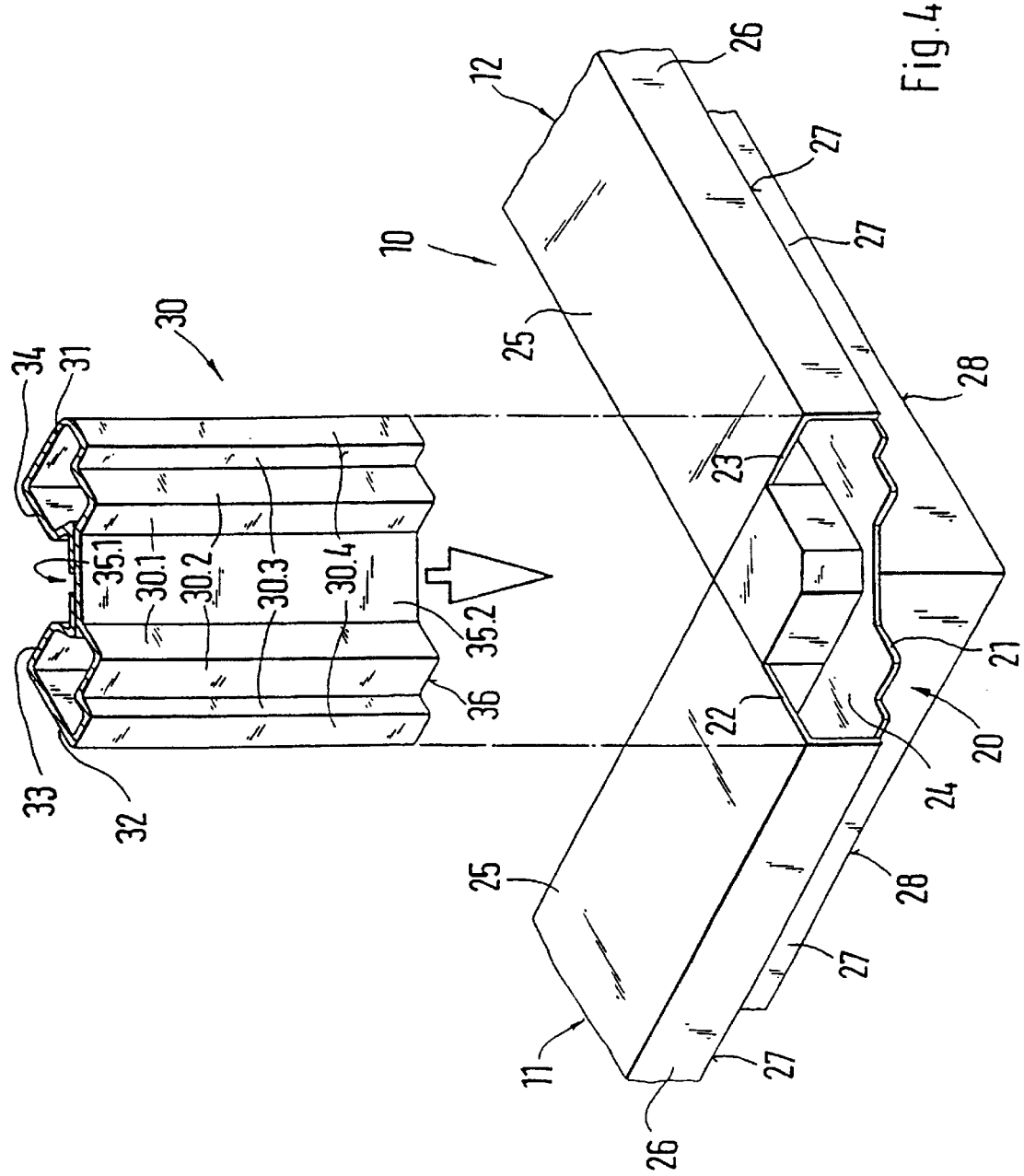
FIG. 4 is an exploded perspective view of an attachment of a vertical frame profile horizontal frame profiles.

FIG. 4 shows a section of a base frame 10 which comprises horizontal frame profiles 11, 12. The horizontal frame profiles 11, 12 feature the same cross sectional geometry. The entire base frame 10 is constructed from four horizontal frame profiles 11, 12, as shown in FIG. 1. To produce the base frame 10, a single punched-flexible part can be used, so that the individual horizontal frame profiles 11, 12 are joined together as a single piece. The horizontal frame profiles 11, 12 have a horizontal inner wall 25, which is followed by a bend 26 angled downward at 90 degrees.

Figure 7:
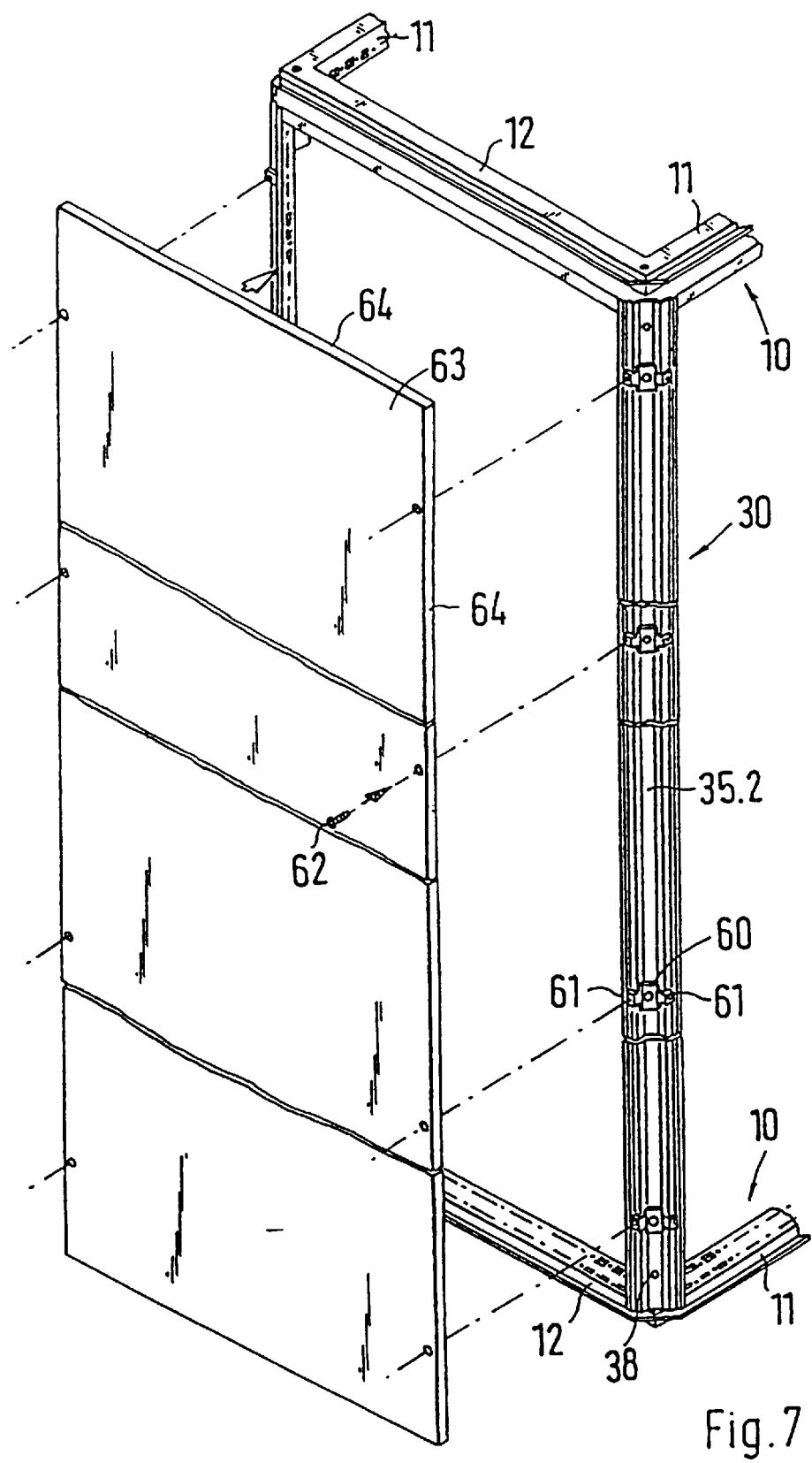
FIG. 7 is an exploded perspective view of the rack according to FIG. 2 with one side wall.
Figure 8:
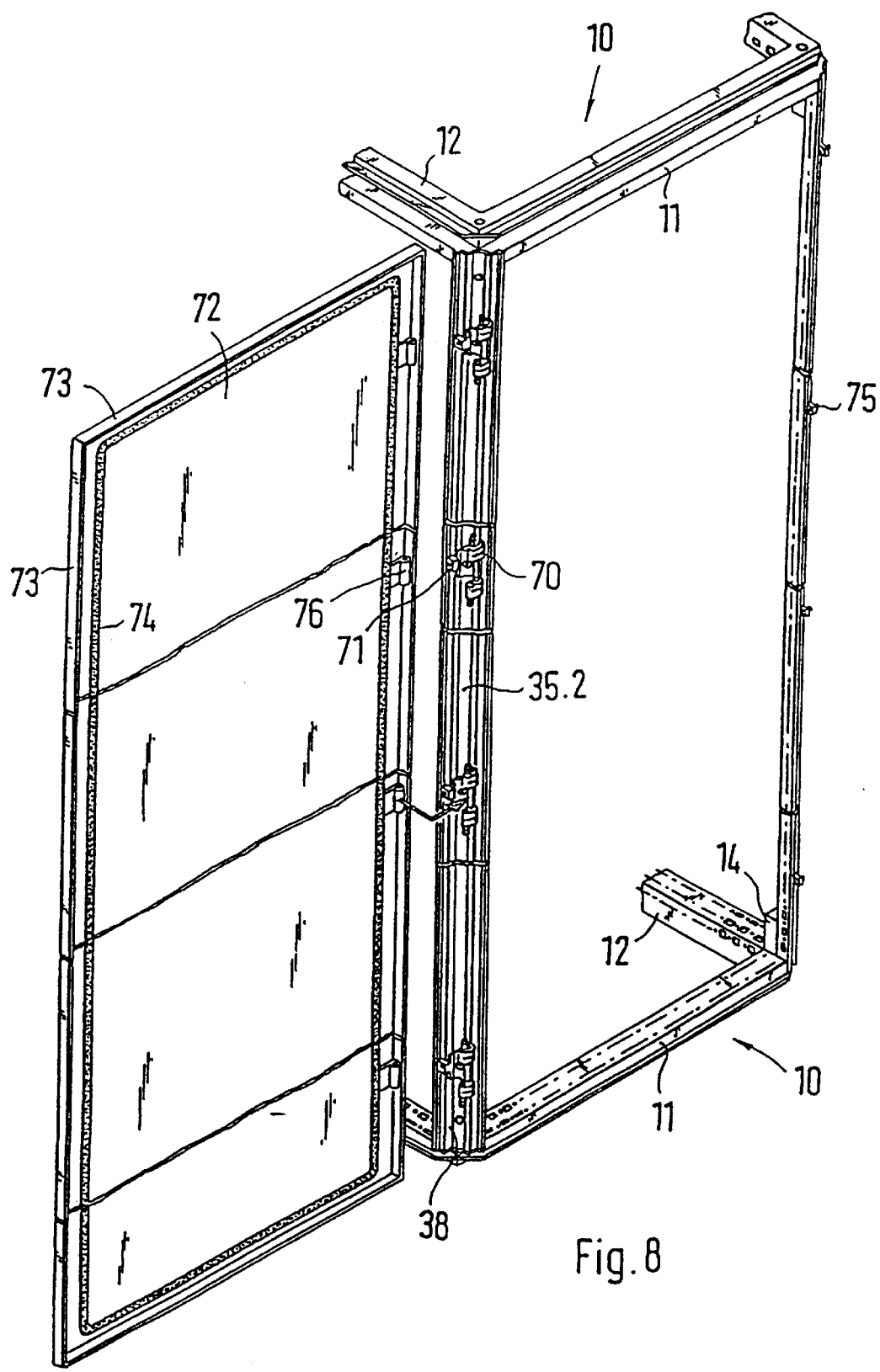
FIG. 8 is an exploded perspective view of the rack according to FIG. 2 with one cabinet door.

The bend 26 is used to support a side wall 63, for example, according to FIG. 7, or a cabinet door 72, for example, according to FIG. 8. To ensure proper sealing, a sealing element can be installed between the side wall 63 or the cabinet door 72 and the bend 26. A horizontal web 27.1 is bent back at a right angle in front of the bend 26. The web 27.1 extends into the downward directed wall 27. A bend of the side wall 63 or of the cabinet door 72 can be held in the free space formed by the web 27.1 and the wall 27.

The wall 27 is closed off with a base unit 28. The base frame 10 can be set up on the ground with this. The horizontal frame profiles 11, 12 have at their front ends a profiling 21 at their webs 27.1. The profiling 21 is again adapted to the outer geometry of the vertical frame profile 30. In the vertical direction, at a distance from the web 27.1 there are terminal stops 22, 23 on the inner walls 25 of the vertical frame profile 30.

The connector 14 is installed in the cavity 20. The connector 14 rests upon the base part 28, in this case and rests sidewise against the walls 27. The horizontal frame profiles 11, 12 can be connected, for example, by welding, to the connector 14 and thus reinforce the lower/upper frame 10.

The vertical frame profile 30 has an outer cavity 35.2 formed as a wall; the outer cavity 35.2 is directed to the outside of the rack. Two hollow chambers extend on both sides of the wall. To form the hollow chambers, the sheet metal is cut and bent appropriately for the vertical frame profile. In particular, a centering section 30.1 adjoins the wall and this section passes into an angle bend 30.3 via a transition piece 30.2. The angle bend 30.3 is positioned perpendicular to the associated sides of the rack. Following the angle bends 30.3 the sealing surfaces 30.4 are attached at a right angle. To form the profiled sides 31, 32, the sealing surfaces 30.4 are bent off at a right angle in the direction of the interior of the rack. The profiled sides 31, 32 run at a right angle into the inner walls 33, 34. The inner walls 33, 34 thus stand parallel to the allocated sides of the rack. The inner walls 33, 34 rest by way of curved end pieces against the wall that forms the outer cavity 35.2. Between the two inner walls 33, 34 an inner cavity 35.1 is created that is oriented toward the interior of the rack.

The vertical frame profile 30 is inserted into the outward-open cavity 20 of the base frame 10. In this case, the profiled sides 31, 32 slide up to the stops 22, 23 of the horizontal frame profiles 11, 12. With its front end 36 the vertical frame profile 30 protrudes toward the support surface 24 of the base frame 10. In this position, the vertical frame profile 30 is aligned at its profiled sides 31, 32. Thus also, the inner walls 33, 34 are positioned toward the interior of the rack.

The precise vertical alignment of the frame profile 30 is possible by means of the profile 21 because it is adapted to the outer geometry of the vertical frame profile 30 and it can be positioned flush.

Figure 5:
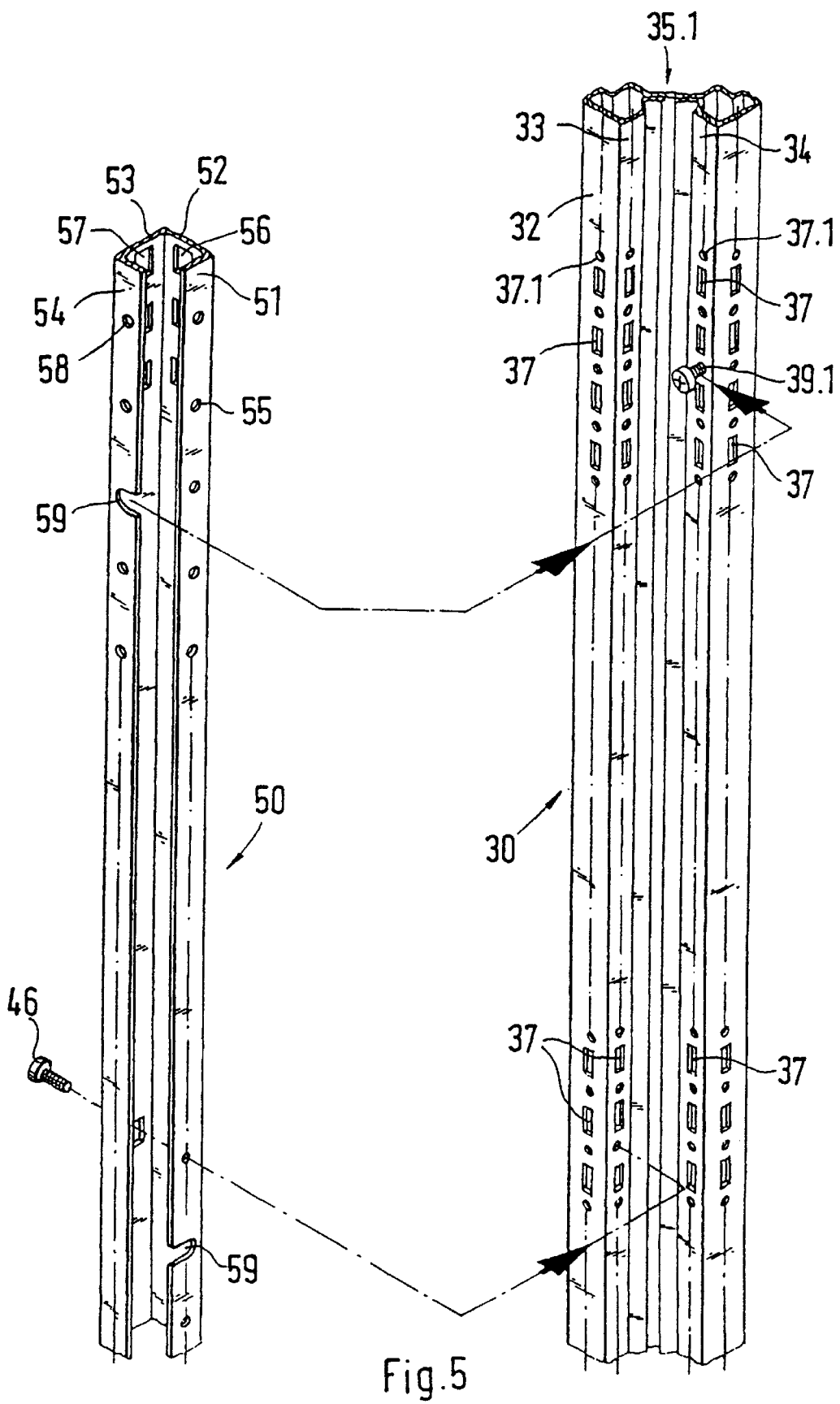
FIG. 5 is an exploded perspective view of a vertical frame profile and of an assembly rail.

FIG. 5 shows in greater detail how an assembly rail 50 can be moved to one of the vertical frame profiles 30. Only a part of the vertical frame profile 30 is shown in the embodiment according to FIG. 5. The assembly rail 50 has a length corresponding to this part. This illustration makes it clear that the assembly rail 50 can be moved in sections to any particular location along the vertical frame profile.

Of course, the assembly rails 50 used in this invention can have a variable length. In particular, they can also extend over the entire axial length of the vertical frame profile 30.

The assembly rail 50 has a quadratic or square cross section formed by two assembly sections 52, 53 joined together at a right angle, and two profiled sections 51, 54. The profiled sections 51, 54 are angled off from the free ends of the assembly sections 52, 53. For example, a hollow profile forms which is open in the region between the profiled sections 51, 54. Assembly cavities 56, 57 are incorporated into the assembly sections 52, 53. Attachment holes 55, 58 are punched out on the profiled sides 51, 54. The assembly cavities 56, 57 and the attachment holes 55, 58 are arranged with the same spacing. The attachment holes 55, 58 are arranged so that they align with the assembly cavities 56, 57 of the assembly section standing parallel to the particular profiled section. The attachment holes 55, 58 are thus accessible via the assembly cavities 56, 57. To attach the assembly rails 50 to the vertical frame profile 30, insertion cavities 59 are incorporated into the profiled sides 51, 54. The insertion cavities 59 are of slit-like design and are open toward the free, vertical end of the profiled sections 51, 54. For each profiled section 51, 54 one insertion cavity 59 is used. To attach the assembly rail 50, first an attachment element 39.1 is screwed into a threaded cavity 37.1 of the vertical frame profile 30. It makes no difference into which of the inner walls 33, 34 of the frame profile 30 the attachment element 39.1, the screw, is screwed in, and will be determined primarily by accessibility. The assembly rail 50 with its insertion cavity 59 of the profiled section 54 is placed onto the bolt section of the screw. This insertion movement is symbolized by the arrow in FIG. 5. If the assembly rail 50 is installed in this manner on the frame profile 30, then it is prepositioned. Due to an assembly cavity 56 of the assembly section 52 aligned with the insertion cavity 59, the head of the screw is accessible to a manipulating tool. If the screw is screwed further into the threaded cavity 39.1, then the screw head will be tensioned onto the profiled section 51. The assembly rail 50 will be pulled into the interior cavity 35.1 of the frame profile 30. The two profiled sections 51, 54 then rest against the inner walls 33, 34. The assembly rail 50 is aligned precisely to the frame profile 30. For additional reinforcement, screws can be introduced through individual assembly cavities 56, 57 into the attachment holes 55, 58 and then screwed into the associated threaded cavities 37.1. Depending on the type and manner of application of the load to the assembly rail 50, one or more additional attachment elements 39.1 can be used.

Figure 6:
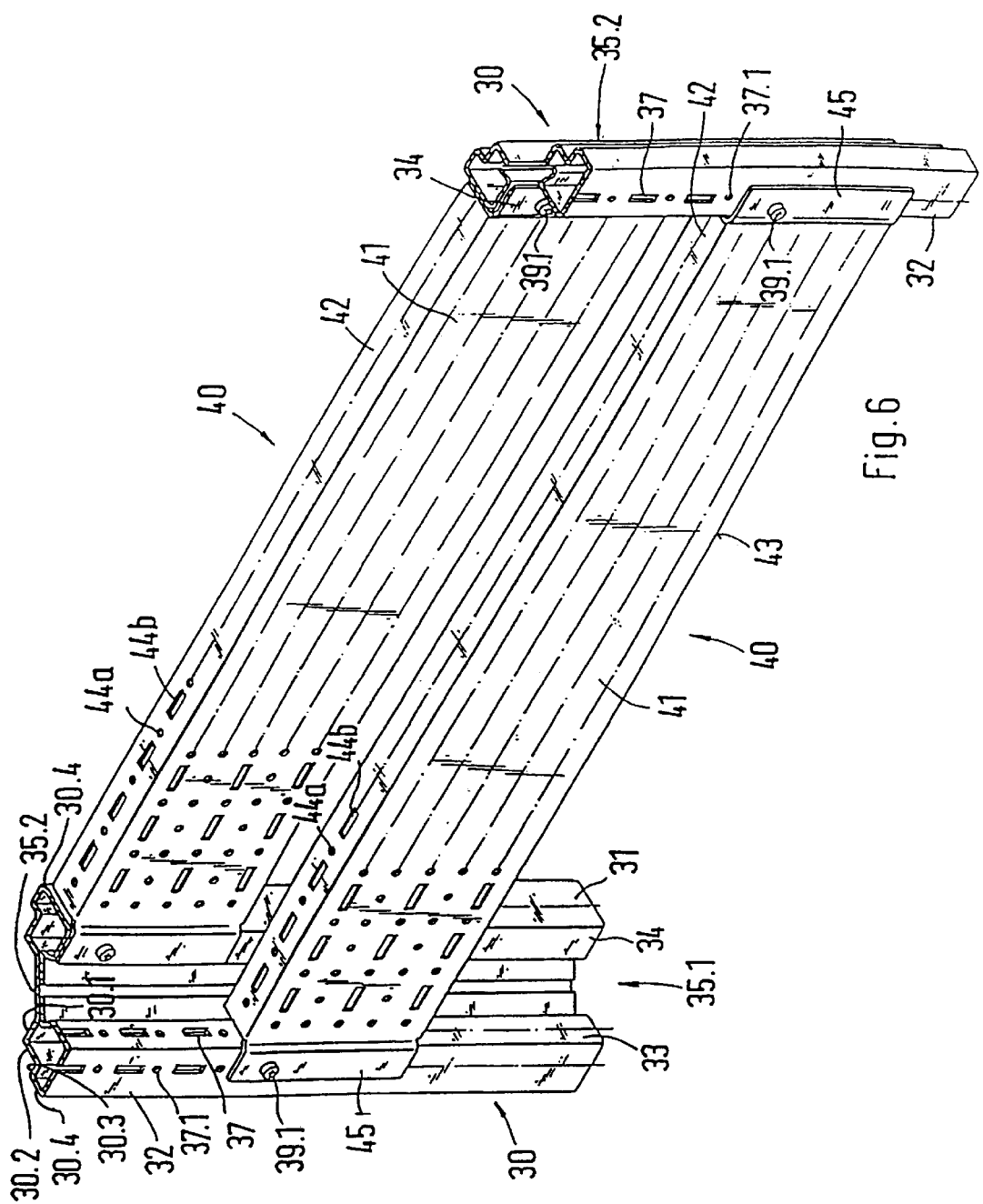
FIG. 6 is a perspective view of vertical frame profiles connected by horizontal assembly rails.

FIG. 6 shows how assembly rails 40 can be attached to two vertical frame profiles 30. The assembly rails 40 essentially correspond to the assembly rails 40, like those shown in FIG. 3. Two different assembly planes aligned in parallel to each other, can be formed by the invented frame profiles 30. As already mentioned, the assembly planes are created by the assembly surfaces 41 of the assembly rails 40.

FIG. 7 shows how attachment elements 60 can be attached to the outer cavity 35.2 of the vertical frame profile 30. The attachment elements 60 have two attachment points with threaded holes 61. To mount the side walls 63, screws 62 are used. The screws 62 are inserted through drilled holes of the side walls 63 and are screwed into the threaded holes 61 of the attachment elements 60. The inner side of the side wall 63 rests flush against the sealing surface 30.4 of the vertical frame profile 30. The attachment elements 60 shown in FIG. 7 can be used to attach two side walls 63, positioned at a right angle to each other, to the rack.

FIG. 8 shows how hinge parts 70 can be attached to the outer cavity 35.2. To provide hinges for a cabinet door 72, additional hinge parts 76 are provided on the door. The additional hinge parts 76 can be attached to the hinge parts 70. A sealing gasket 74 is supplied on the inner wall of the cabinet door 72. The gasket 74 rests flush against the sealing surface 30.2 of the vertical frame profile 30. The illustration according to FIG. 8 clearly shows that the hinge part 70 supports a threaded hole 71 on one side wall mount. Thus a side wall can be attached to the hinge part 70 at a right angle to the front side of the rack.

What is claimed is:

1. In a switching cabinet with a rack having horizontal and vertical frame profiles (11, 12, and 30), where the horizontal frame profiles (11, 12) form a lower frame and an upper frame (10) and the vertical frame profiles (30) are attached in corner regions of the lower frame and the upper frame (10), where the vertical frame profiles (30) are symmetrical to a cross-sectional diagonals running across virtual vertical outer edges of the rack, where the vertical frame profiles (30) turned towards a inside of the switching cabinet have an open inner cavity (35.1), where vertical assembly rails (50) can be mounted in the inner cavity (35.1), where one profiled side (31, 32) perpendicular to an outside of the rack is joined to inner walls, and where the inner walls (33, 34), the assembly rails (50) and the profiled sides have rows of fastening cavities (56, 57) inserted according to a division grid, the improvement comprising: the inner walls (33, 34) and the profiled sides (31, 32) having rows of attachment cavities (37, 37.1) installed in the division grid.

2. In the switching cabinet according to claim 1, wherein the vertical frame profiles (30) at their profile sides (31, 32) pass into sealing surfaces (30.4) running parallel to side surfaces of the rack.

3. In the switching cabinet according to claim 2, wherein the lower and the upper frame (10) have in comer regions cavities (20) open toward the outside of the rack, and the cavities (20) are formed by front sides of the horizontal frame profiles butt-jointed at a right angle.

4. In the switching cabinet according to claim 3, wherein comer connectors (14) are installed in the cavities (20) of the lower and the upper frame (10), and the vertical frame profiles (30) are inserted horizontally into the cavities (20) and securely attached to the comer connectors (14).

5. In the switching cabinet according to claim 4, wherein the vertical frame profiles (30) have an outer cavity (35.2) running in a profile length direction, the outer cavity (35.2) is formed by a wall which stands perpendicular to the cross-sectional diagonals running through the virtual outer edges of the rack, and two centering sections (30.1) of the vertical frame profile (30) are connected to the wall at an angle.

6. In the switching cabinet according to claim 5, wherein the vertical frame profiles (30) of at least one side of the rack are combined by connecting pieces (40) into a separate assembly unit.

7. In the switching cabinet according to claim 6, wherein the connecting pieces (40) are designed as assembly rails which have an assembly surface (41) facing the interior of the switching cabinet, and the assembly surface (41) has at least one row of fastening cavities (44a) at equal spacing.

8. In the switching cabinet according to claim 7, wherein the lower and the upper frames (10) are designed as same assemblies.

9. In the switching cabinet according to claim 8, wherein the assembly rails (50) mountable in the inner cavity (35.1) of the vertical frame profile (30) have at least one profiled leg (51, 54) with at least one insertion cavity (59) by which the cavity can be inserted onto an attachment element (39.1) that is mounted on the vertical frame profile (30), and an attachment element (39.1) is adjustable with respect to the vertical frame profile (30) for attachment of the assembly rails (50).

10. In the switching cabinet according to claim 9, wherein at least one of the lower frame and the upper frame (10) has a perimeter rain trough (12*a*) interrupted only in the corner regions of the rack.

11. In the switching cabinet according to claim 1, wherein the lower and the upper frame (10) have in corner regions cavities (20) open toward the outside of the rack, and the cavities (20) are formed by front sides of the horizontal frame profiles buttjointed at a right angle.

12. In the switching cabinet according to claim 11, wherein corner connectors (14) are installed in the cavities (20) of the lower and the upper frame (10), and the vertical frame profiles (30) are inserted horizontally into the cavities (20) and securely attached to the corner connectors (14).

13. In the switching cabinet according to claim 1, wherein the vertical frame profiles (30) have an outer cavity (35.2) running in a profile length direction, the outer cavity (35.2) is formed by a wall which stands perpendicular to the cross-sectional diagonals running through the virtual outer edges of the rack, and two centering sections (30.1) of the vertical frame profile (30) are connected to the wall at an angle.

14. In the switching cabinet according to claim 1, wherein the vertical frame profiles (30) of at least one side of the rack are combined by connecting pieces (40) into a separate assembly unit.

15. In the switching cabinet according to claim 14, wherein the connecting pieces (40) are designed as assembly rails which have an assembly surface (41) facing the interior of the switching cabinet, and the assembly surface (41) has at least one row of fastening cavities (44*a*, 44*b*) at equal spacing.

16. In the switching cabinet according to claim 1, wherein the lower and the upper frames (10) are designed as same assemblies.

17. In the switching cabinet according to claim 1, wherein the assembly rails (50) mountable in an inner cavity (35.1) of the vertical frame profile (30) have at least one profiled leg (51, 54) with at least one insertion cavity (59) by which the cavity can be inserted onto an attachment element (39.1) that is mounted on the vertical frame profile (30), and an attachment element (39.1) is. adjustable with respect to the vertical frame profile (30) for attachment of the assembly rails (50).

18. In the switching cabinet according to claim 1, wherein at least one of the lower frame and the upper frame (10) has a perimeter rain trough (12*a*) interrupted only in corner regions of the rack.

* * * * *